Figure 1:
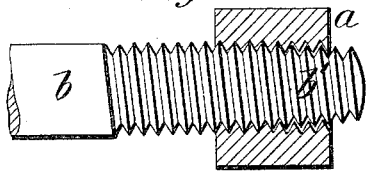

(No Model.) 5 Sheets—Sheet 1.
A. B. IBBOTSON.
MANUFACTURE OF LOCK NUTS FOR SCREW BOLTS.

No. 426,185. Patented Apr. 22, 1890.

Witnesses
J. S. Rutherford
Robert Everitt

Inventor
Alfred B. Ibbotson
By James L. Norris
Atty.

THE NORRIS PETERS CO., PHOTO-LITHO., WASHINGTON, D. C.

(No Model.) 5 Sheets—Sheet 2.
A. B. IBBOTSON.
MANUFACTURE OF LOCK NUTS FOR SCREW BOLTS.

No. 426,185. Patented Apr. 22, 1890.

Witnesses:
J. A. Rutherford.
Robt. Everett.

Inventor:
Alfred B. Ibbotson.
By James L. Norris.
Atty.

(No Model.) 5 Sheets—Sheet 3.
A. B. IBBOTSON.
MANUFACTURE OF LOCK NUTS FOR SCREW BOLTS.
No. 426,185. Patented Apr. 22, 1890.
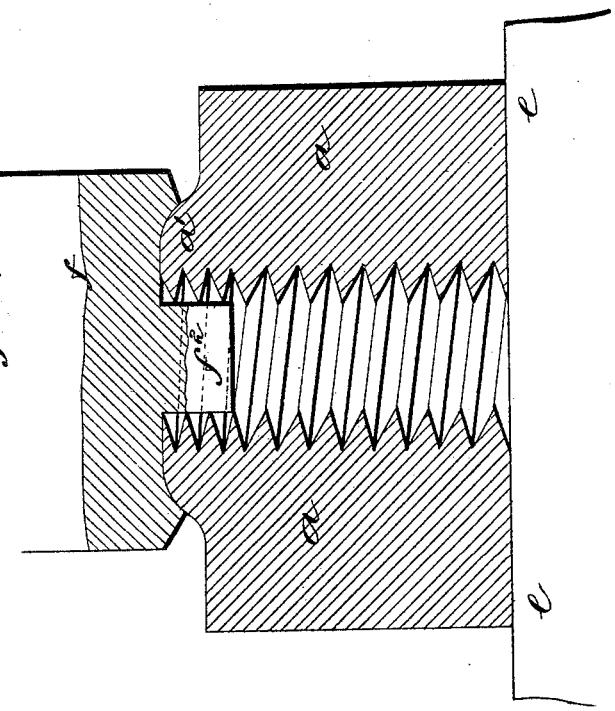
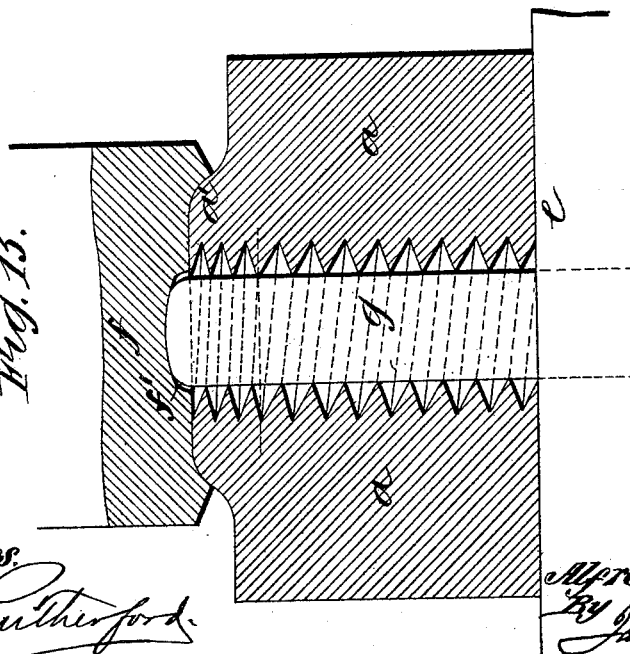
Witnesses
J. A. Rutherford
Robt. Emmett
Inventor
Alfred B. Ibbotson.
By James L. Norris
Atty.

(No Model.) 5 Sheets—Sheet 4.
A. B. IBBOTSON.
MANUFACTURE OF LOCK NUTS FOR SCREW BOLTS.
No. 426,185. Patented Apr. 22, 1890.
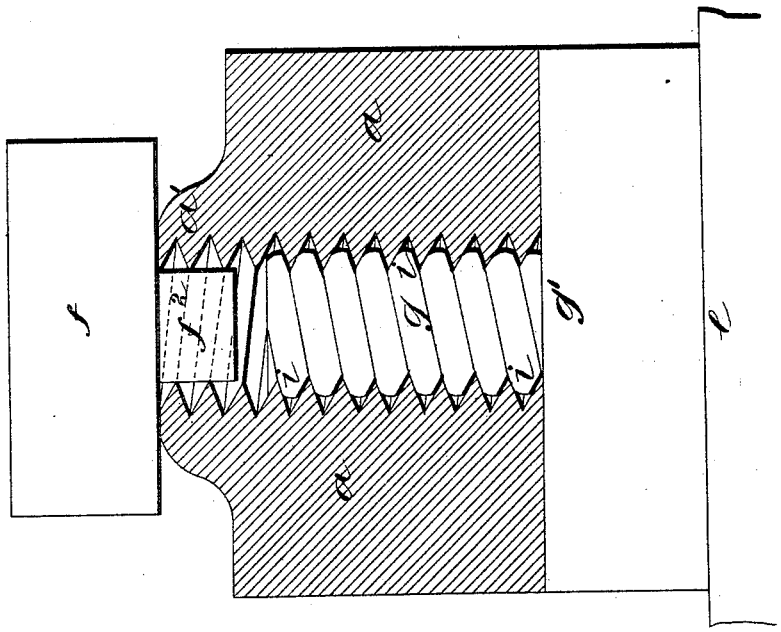
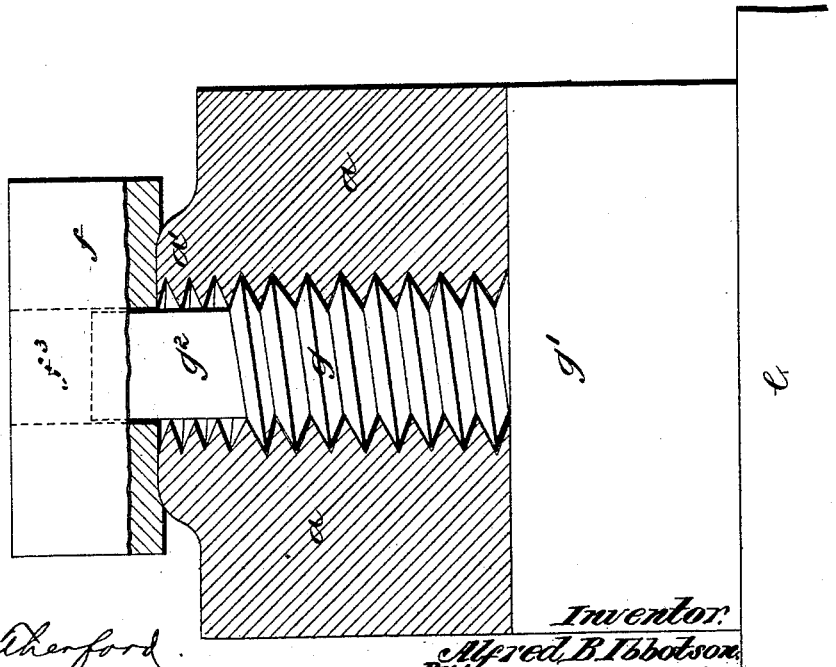
Witnesses  
Inventor  
Alfred B. Ibbotson (No Model.) 5 Sheets—Sheet 5.
A. B. IBBOTSON.
MANUFACTURE OF LOCK NUTS FOR SCREW BOLTS.
No. 426,185. Patented Apr. 22, 1890.
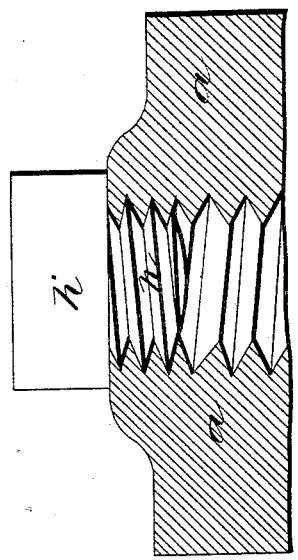
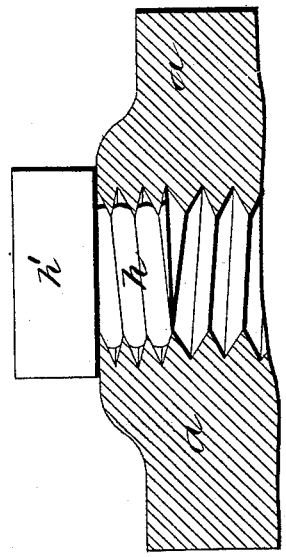
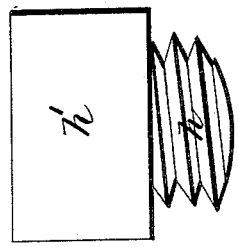
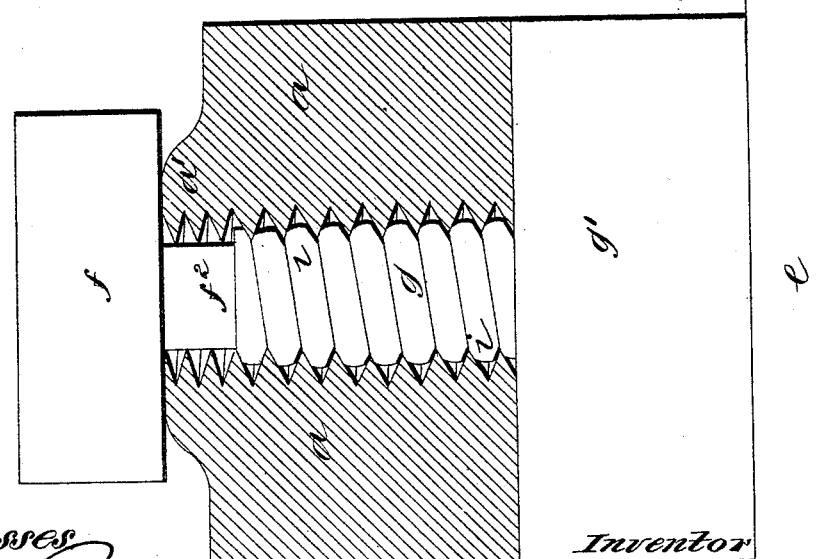
Witnesses
Inventor
Alfred B. Ibbotson
By James L. Norris
Atty.

UNITED STATES PATENT OFFICE.

ALFRED BUCKINGHAM IBBOTSON, OF SHEFFIELD, ENGLAND.

MANUFACTURE OF LOCK-NUTS FOR SCREW-BOLTS.

SPECIFICATION forming part of Letters Patent No. 426,185, dated April 22, 1890.

Application filed March 10, 1888. Serial No. 266,831. (No model.) Patented in England September 8, 1886, No. 11,438, and March 15, 1887, No. 3,929; in Victoria August 15, 1887, No. 5,240; in France August 22, 1887, No. 185,426; in Belgium August 22, 1887, No. 78,636; in Italy October 8, 1887, XLIV, 38, and in New South Wales October 29, 1887, No. 296.

*To all whom it may concern:*

Be it known that I, ALFRED BUCKINGHAM IBBOTSON, of Ibbotson Brothers & Co., (Limited,) a subject of the Queen of Great Britain, and a resident of Sheffield, England, have invented new and useful Improvements Relating to Lock-Nuts for Screw-Bolts, (for which I have obtained patents in France, No. 185,426, dated August 22, 1887; in Belgium, No. 78,636, dated August 22, 1887; in Victoria, No. 5,240, dated August 15, 1887; in Italy, October 8, 1887, Vol. 44, No. 38; in New South Wales, No. 296, dated October 29, 1887, and in Great Britain, No. 11,438, dated September 8, 1886, and No. 3,929, dated March 15, 1887,) of which the following is a specification, reference being had to the accompanying drawings.

My invention relates to lock-nuts for screw-bolts, chiefly designed for securing railway-rails at their joints or in or on their chairs or sleepers.

In the specification of former Letters Patent of the United States No. 226,450, dated April 13, 1880, a screw-fastening is described comprising a nut in which the screw-threads are so formed that without the use of separate or additional locking or fastening devices it will have a secure and permanent grip or hold upon the bolt to which it is applied, this object being accomplished by making some of the screw-threads in the nut of such a smaller diameter or with such difference or interruption of pitch that they cannot without the exertion of much greater force than can be applied by the fingers alone be screwed home upon the bolt. These nuts are now generally known as "Ibbotson" lock-nuts.

The object of my present invention is to provide for the manufacture of such nuts in a more accurate and less costly manner than has hitherto been practicable. I accomplish this result according to my present invention by the compression of the nut while upon a mandrel, as hereinafter set forth.

I am aware that it has been already proposed to make lock-nuts with the threads in one part thereof reduced in diameter by compression applied after the nut has been tapped in the ordinary manner; but the method adopted of reducing the diameter of the threads will not insure the result the attainment of which is the object of one part of my invention, as it does not provide for effectually compressing the nut without distorting its threads or altering the same in respect of their pitch, depth, or width.

In the manufacture of a lock-nut according to one part of my present invention I first tap a nut in the ordinary manner—that is to say, I form therein parallel screw-threads adapted to properly fit the bolt with which the said nut is to be used. I then complete the manufacture of the said nut to adapt it for the purpose of my invention by placing the said nut upon a taper screw-threaded mandrel and compressing one end of the said nut by pressure or by impact, as hereinafter more particularly described.

Figure 2:
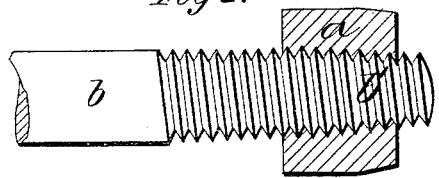

In the accompanying drawings, Figure 1 is a sectional elevation showing a taper mandrel and a nut placed thereon, the latter being provided with ordinary or parallel screw-threads. Fig. 2 is a similar view showing the said nut compressed at one end thereof. The remaining figures of the drawings are hereinafter referred to.

Like letters indicate corresponding parts throughout the drawings.

Figure 3:
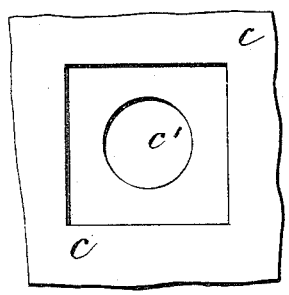
Figure 4:
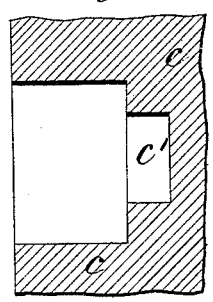
Figure 5:
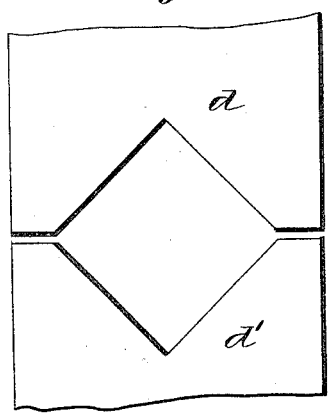
Figure 6:
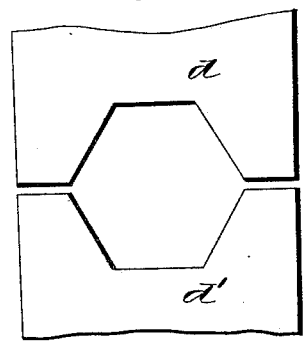
Figure 12:
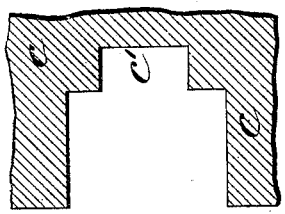
Figure 11:
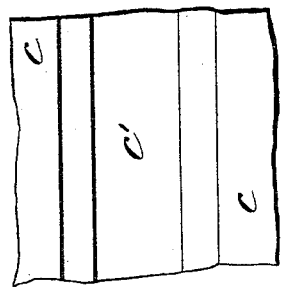

*a* is the nut, and *b* is the screw-threaded mandrel, which is preferably formed of steel and hardened, and the end *b'* of which is tapered or reduced in diameter, so that the threads thereon are an exact counterpart of the reduced threads required to be formed thereby in the nut. In combination with the said mandrel I use a receptacle for holding the nuts so that they cannot turn with the screw-threaded mandrel during the insertion of the same. For instance, I use a receptacle or holder *c*, as shown in front elevation and in transverse section in Figs. 3 and 4 or in Figs. 11 and 12. This receptacle or holder is formed with a hole or cavity *c'* large enough to permit the end of the mandrel to enter it. The nut, preferably after being heated, is placed in the said holder. The mandrel is then screwed into the nut until the end or point of the said mandrel passes clear through the said nut into the said hole or cavity $c'$, which is made of such length or depth that its inner end will serve as a stop for the mandrel, so that the taper or reduced threads on the mandrel may be readily caused to occupy the proper position within the parallel threads in that part of the nut which it is desired shall be compressed. Then, after removing the nut from the holder and while the mandrel is in this position relatively to the ordinary parallel threads of the said nut, by the application of pressure to the outside of the nut the part of the same in which the threads are to be reduced in diameter is closed in around and upon the taper portion of the mandrel, so that the screw-threads in such part or end of the nut are forced into the taper or small threads of the mandrel and receive therefrom the exact configuration required, as shown in Fig. 2. I prefer that the pressure should be so applied as to simultaneously compress the sides and corners or angles of the nut. For this purpose I use pressing-dies or swages, such as those shown at $d$, $d'$ in Figs. 5 and 6, which are front elevations showing, respectively, dies or swages for square and hexagonal nuts. It is obvious, however, that I may use other suitable devices for effecting the compression of one end of the nut while the same is held down upon the taper screw-threaded mandrel, as above described. The outer end of the mandrel $b$ is made to serve as a handle, by which the nut when screwed upon the other screw-threaded end of this mandrel can be conveniently held and manipulated to facilitate its compression. The mandrel $b$ serves not only as a tool for finishing the small screw-threads in the nuts, but also as a gage, which in the manufacture of any number of such nuts will insure the making of the threads in all of them accurately to one uniform size.

Figure 10:
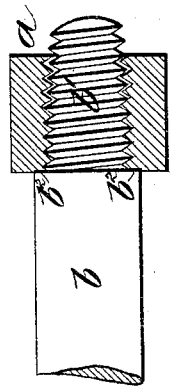

I sometimes provide other means than those above described for stopping the said mandrel when the end of the same has been forced through the nut the exact distance required to bring its taper threads into the proper position relatively to the nut, as illustrated in Fig. 1. For instance, I make the mandrel $b$ with a shoulder $b^2$, Fig. 10, which, when the mandrel has been screwed the required distance through the nut, will come in contact with the face of the said nut. The length or depth of the hole or cavity $c'$ in the holder $c$ need not in this case be limited as above described.

In the said former specification are described nuts which have grooves or slots formed across and partly through them and having cutting-edges. The nuts made according to my present invention are not necessarily formed with such grooves or slots. In some instances, however, it will be advantageous to so form them. The slots or grooves are made through the part of the nut which contains or is intended to contain the reduced or taper threads. The slitting or grooving is, however, of such a character that, while facilitating the application of the nut to its bolt, it will not alter the screw-threads which have been or will thereafter be formed by the mandrel in such a manner as to impair their efficiency in holding the nut upon the bolt.

In practice I find it better to form the slots in the nut before it is tapped even with the ordinary parallel threads, or before any of the parallel threads are compressed, as the said slots, if formed previous to compression, enable me to compress those portions of the threads requiring compression while the nut is at an extremely low heat, and, indeed, in this case, the compression required can be accomplished satisfactorily in most instances without any heating of the nuts.

Figure 7:
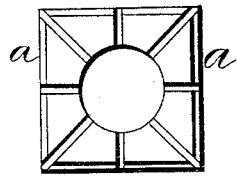
Figure 9:
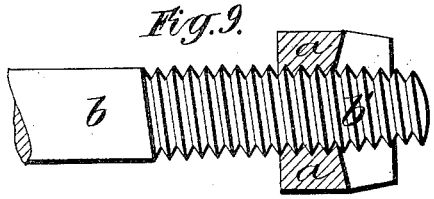
Figure 8:
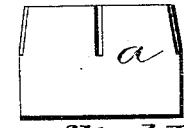

Fig. 7 is a plan, and Fig. 8 a side elevation, of a nut formed with the said slits or grooves, and Fig. 9 is a sectional elevation showing one of these nuts upon a taper screw-threaded mandrel, such as that above described.

In making a lock-nut according to another part of my present invention, to obtain the difference or interruption of the pitch I first tap the same in the ordinary manner with parallel screw-threads adapted to properly fit the bolt with which the said nut is to be used. I then reduce the pitch of the threads in one end of the nut by the application of vertical or endwise pressure to the same while the said nut is upon a mandrel, which mandrel prevents any diminution of the diameter of its threads, as hereinafter described.

In the accompanying drawings, Fig. 13 shows in sectional elevation an ordinary parallel threaded nut $a$, with some of its threads compressed, placed on the bed $e$ of a pressing-machine under a pressing-tool $f$, and a mandrel $g$ inserted in the said bed. Fig. 14 is a similar view illustrating a modification of my invention. The remaining figures are hereinafter referred to.

I prefer to make to the nut $a$ with a circular projection around the hole thereof at $a'$—that is to say, at the end which is to be compressed. To effect the compression, I place the said nut, after the ordinary or parallel screw-threads have been formed therein, upon the solid bed or anvil $e$, as shown in Fig. 13, a steel or other mandrel $g$, which is supported in the bed $e$, being introduced into the screw-threaded hole of the nut, and the said nut being, by preference, previously heated at the end which is to be compressed. I then force the die or pressing-tool $f$ down upon the top of the nut, thereby compressing the upper end thereof. The die $f$ may be operated by hydraulic or other power. The mandrel $g$ (shown in Fig. 13) is plain or cylindrical and of such diameter that the edges of the threads of the nut are in contact with or in close proximity to its periphery. The mandrel is supported, and is, by preference, secured in the bed $e$ and projects vertically therefrom, so that the nut can be readily slipped over it when the compression is to be effected and can be readily removed therefrom after the compression. The said mandrel is preferably of such length that its upper end will reach exactly to and be flush with the upper surface of the nut before compression and will extend slightly beyond it after compression, a suitable hole or cavity $f'$ being formed in the compressing-tool or die $f$ to admit the projecting end of the mandrel, as shown. The said mandrel, therefore, serves as a gage or stop for determining or regulating the amount of compression applied to the nut; or, as shown in Fig. 14, the plain mandrel may be a short one $f^2$, projecting from the compressing-tool $f$. In some instances the mandrel $g$ is provided with screw-threads for a part of its length, as shown in Figs. 15, 16, and 17, so that it will fit and preserve from compression those threads of the nut which are not intended to be compressed, the plain or unscrewed portion of the mandrel (shown at $g^2$ in Fig. 15) being of such diameter that it will be in contact with or in close proximity to the edges of the threads to be compressed. The mandrel is, moreover, in some instances formed with a square or other flat-sided head $g'$, as shown in Figs. 15, 16, and 17, which will serve for conveniently turning the mandrel into and out of the nut.

To prevent the rapid wear of the screw-threads on the mandrel, I sometimes turn off the thinnest portions or edges of the said threads, as shown at $i$ in Figs. 16 and 17, so that they do not entirely fill the spaces within the female threads of the nut, and yet will effectually prevent the compression or reduction of the pitch of such threads.

In some cases the mandrel $g$ is formed with a screw-threaded portion only, which also extends only partially through the nut, as shown in Figs. 16 and 17, and the pressing die or tool $f$ may be formed separately from the machine with a plain or unscrewed projecting pin or mandrel $f^2$, as also shown in Figs. 16 and 17, of the correct diameter to fit and pass easily between the inner edges of the screw-threads to be compressed. This pin or rod should be of such length that when it is introduced into the nut there will be a space between it and the upper end of the mandrel $g$, as shown in Fig. 16; but when the compression has been effected the end of the said mandrel $g$ and the end of the said pin or rod $f^2$ will touch each other, as shown in Fig. 17, thus regulating the amount of compression; or the said compressing-tool $f$ may be formed as a separate piece from the compressing-machine with a hole therein, as at $f^3$ in Fig. 15, of the correct size to permit the plain projecting end $g^2$ of the mandrel to pass through or into it, as shown in Fig. 15. If desired, the hole $f^3$ may extend only so far into the compressing-tool that as soon as the required compression has been given to the threads to be compressed the end of the said hole will come into contact with the mandrel, and further downward movement of the compressing-tool will thus be prevented.

By the compression of the nut as above described a difference or interruption of pitch is obtained, such as is described in the said former specification, No. 226,450—that is to say, some of its threads are flattened or forced nearer together, so that when the nut is screwed upon an ordinary bolt much greater force will be required than can be applied by the fingers alone to cause the compressed threads of the nut to engage with the threads of the bolt, and consequently the bolt and nut will be securely locked together without the necessity for applying any separate device or appliance for this purpose. When the compressed threads of the nut engage with the threads of the bolt in the act of screwing the nut thereon, the said compressed threads are gradually and regularly separated or widened out. Therefore no distortion of the threads of the bolt is produced, and yet the frictional contact between these threads and the compressed threads of the nut is amply sufficient to prevent the separation of the nut and bolt through vibration or similar action to which such fastenings are exposed in use.

In order that the action of the bolt in expanding the compressed threads may be more certain, I prefer to use bolts made of hard metal and to make the nuts of somewhat softer metal.

In some instances, in order to insure uniformity of pitch of the compressed threads of the nuts, and consequent uniformity of grip upon the bolts, I employ an additional mandrel $h$, and by preference one with a square or flat-sided head $h'$, as shown in side elevation in Fig. 18. This mandrel is formed with screw-threads which are an exact counterpart of the flattened or reduced threads required to be formed in the nut. The screw-threads of this mandrel may be formed with sharp edges, as shown in Figs. 18 and 19, or they may have their edges or thinnest portions turned off, as shown in Fig. 20. After the compression has been effected, as above described, and the first mandrel $g$, Figs. 13 to 17, has been removed, this additional or finishing mandrel $h$ is screwed into that portion of the nut containing the compressed threads, which thus have imparted to them a uniform pitch throughout. The exact gripping-power desired may thus be insured. The additional mandrel may in some cases be inserted within the nut before the other mandrel is withdrawn. The nut may be compressed either while hot or cold.

My present invention affords the means for very advantageously making Ibbotson lock-nuts adapted for use with the improved bolts described in the specification of British Letters Patent granted to me, and dated August 13, 1886, No. 10,402.

It is evident that I can, if desired, take ordinary screw-nuts and convert them into lock-nuts in the manner hereinbefore described.

What I claim is—

1. The method of manufacturing a lock-nut such as is described in the said former specification, No. 226,450, by compressing or swaging one end of a screw-nut while the same is held upon a mandrel, substantially as and for the purpose specified.

2. The method of manufacturing a lock-nut such as described in the said former specification, No. 226,450, consisting in compressing or swaging one end of a screw-nut while the same is held upon a taper screw-threaded mandrel, substantially as and for the purpose specified.

3. The improved screw-threaded mandrel with or without the shoulder formed of hard or hardened steel and having some of its screw-threads reduced in diameter, substantially as and for the purpose set forth.

4. The combination, with the taper screw-threaded mandrel, of a holder for the nuts, substantially as and for the purpose set forth.

5. The method of manufacturing a lock-nut by vertical or endwise compression of the threads at one end of a screw-nut while the said nut is upon a mandrel, which prevents compression of the remainder of its threads or diminution of the internal diameter of its threads, substantially as and for the purpose set forth.

6. The method of manufacturing lock-nuts, consisting in compressing one end of a screw-nut containing a plain mandrel in such a manner as to diminish the pitch of a few of the screw-threads of the said nut without altering their internal diameter, substantially as described.

7. In the manufacture of a lock-nut by the vertical or endwise compression of some of the threads of a screw-nut, inserting in the said nut a screw-threaded mandrel for preventing deformation or distortion of the threads which are not to be compressed, substantially as described.

8. A screw-threaded mandrel with the thinnest portions or edges of the threads turned off, as shown in Figs. 16 and 17, substantially as and for the purposes set forth.

9. A screw-threaded mandrel having a head or base $g'$ and a projecting unscrewed portion $g^2$, substantially as and for the purposes set forth.

10. The combination, with a mandrel on which the nut to be compressed is placed, of a compressing-tool made separately from the pressing-machine, as shown at $f^2$ in Figs. 15 to 17, substantially as and for the purpose set forth.

11. The method of insuring uniformity of the compressed threads by means of a screw-threaded mandrel $h$, substantially as and for the purpose set forth.

12. The method of manufacturing a lock-nut, consisting in heating one end of a screw-nut, compressing some of the threads therein, and then inserting a screw-threaded mandrel into the compressed end of the said nut, substantially as and for the purpose set forth.

In testimony whereof I have hereunto signed my name in the presence of two subscribing witnesses.

ALFRED BUCKINGHAM IBBOTSON.

Witnesses:
ISAAC R. DILLER,
SPIRITO BERNARDI.